United States Patent [19]

Kishi et al.

[11] Patent Number: 4,723,203
[45] Date of Patent: Feb. 2, 1988

[54] AUTOMATIC MACHINING PROCESS DETERMINATION METHOD IN AN AUTOMATIC PROGRAMMING SYSTEM

[75] Inventors: Hajimu Kishi; Masaki Seki; Kunio Tanaka; Teruyuki Matsumura, all of Tokyo, Japan

[73] Assignee: Fanuc Ltd., Tokyo, Japan

[21] Appl. No.: 767,264

[22] PCT Filed: Dec. 14, 1984

[86] PCT No.: PCT/JP84/00589

§ 371 Date: Aug. 7, 1985

§ 102(e) Date: Aug. 7, 1985

[87] PCT Pub. No.: WO85/02692

PCT Pub. Date: Jun. 20, 1985

[30] Foreign Application Priority Data

Dec. 14, 1983 [JP] Japan .................................. 58-235452

[51] Int. Cl.[4] .................... G06F 15/46; G06F 3/04; G05B 19/18
[52] U.S. Cl. ..................................... 364/171; 364/191; 364/474
[58] Field of Search ........ 364/164, 170, 171, 191–193, 364/474, 475; 318/568

[56] References Cited

U.S. PATENT DOCUMENTS

| | | | |
|---|---|---|---|
| 4,445,182 | 4/1984 | Morita et al. | 364/170 |
| 4,490,781 | 12/1984 | Kishi et al. | 364/191 |
| 4,513,366 | 4/1985 | Munekata et al. | 364/191 |
| 4,530,046 | 7/1985 | Munekata et al. | 364/171 |
| 4,547,854 | 10/1985 | Hashimoto et al. | 364/171 |
| 4,549,270 | 10/1985 | Fukumura et al. | 364/474 |

Primary Examiner—Jerry Smith
Assistant Examiner—John R. Lastova
Attorney, Agent, or Firm—Staas & Halsey

[57] ABSTRACT

A machining process determination method in automatic programming for automatically creating NC data for a lathe. The method includes storing machining processes in a memory in a machining sequence, reading the previously stored machining processes out of the memory in order after entry of a blank profile (BP) and part profile (PF); automatically discriminating based on the blank profile and final part profile whether the read machining process is needed to obtain a final part; when it is not required, performing identical discrimination processing upon reading the next machining process out of the memory, and when it is required, determining a cutting domain (A1, A2, A3) and cutting direction of the machining process; and thereafter creating NC data upon reading subsequent machining processes out of the memory and performing identical processing.

9 Claims, 27 Drawing Figures

```
=·= FAPT =·=

1. BLANK AND PART (DRAWING AND BLANK)
2. BLANK AND PART (PART PROFICE)
3. MACHINE REFERENCE POINT AND TURRET
   POSITION
4. MACHINING DEFINITION
5. CREATION OF NC DATA

0. END

NO. =
```

```
☆☆☆ BLANK AND PART ☆☆☆ MATERIAL

NO.    EXAMPLE OF MATERIAL
1      S45C
2      SCM
3      FC
4      AL
5      SUS
6      MATERIAL6
7      MATERIAL7
⋮       ⋮

MATERIAL NO. =
```

☆☆☆ BLANK AND PROFILE ☆☆☆ DRAWING FORMAT

DRAWING FORMAT ---- DF =

FIG.2(G)

☆☆☆MACHINING DEFINITION ☆☆☆ TYPE OF MACHINING

PROCESS 1.

TYPE OF PROCESS ------ PROCESS 01=
1. CENTER BORING
2. DRILLING
3. OUTER DIAMETER ROUGH CUTTING
4. INNER DIAMETER ROUGH CUTTING
5. OUTER DIAMETER INTERMEDIATE FINISHING
6. INNER DIAMETER INTERMEDIATE FINISHING
7. INNER DIAMETER FINISHING
8. OUTER DIAMETER FINISHING
9. END FACE ROUGH CUTTING
10. GROOVE CUTTING
11. THREAD CUTTING
12. END FACE FINISHING

FIG.2(H)

☆☆☆MACHINING DEFINITION ☆☆☆ TOOL DATA

PROCESS 01 OUTER DIAMETER ROUGN CUTTING  T  X  Z

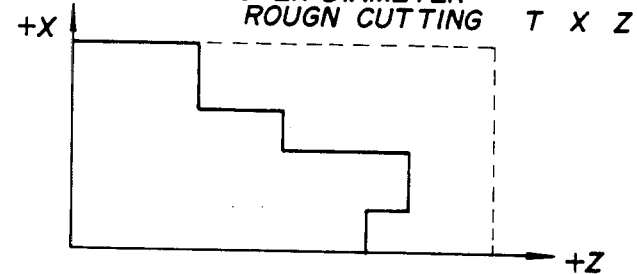

MACHINING DATA (T CODE):
  PROCESS NO. ----- TN=
  TOOL POSITION
    CORRECTION NO.---TM=
  TN=

FIG.2(I)

☆☆☆MACHINING DEFINITION ☆☆☆

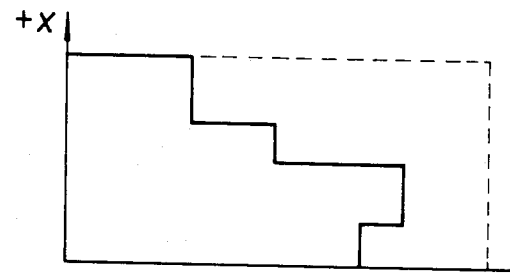

CUTTING CONDITIONS
  CLEARANCE QUANTITY---- CX=2
                         CZ=2
  FINISHING TOLERANCE--- TX=1
                         TZ=1
  DEPTH OF CUT -------- D=5

BACK-UP QUANTITY --- U=1
  CUTTING VELOCITY --- V=14.5
  FEEDRATE --- F1=0.65
               F2=0.32
               F3=0.21

AUTOMATIC MACHINING PROCESS DETERMINATION METHOD IN AN AUTOMATIC PROGRAMMING SYSTEM

CROSS REFERENCE TO RELATED APPLICATIONS AND PATENTS

This application is related to copending U.S. patent application having Ser. No. 764,174 and to U.S. Pat. No. 4,490,781, both assigned to an assignee common to this application.

BACKGROUND OF THE INVENTION

This invention relates to a machining process determination method in automatic programming and, more particularly, to a machining process determination method whereby machining processes such as predrilling, rough cutting of outer diameter, outer diameter finishing, rough cutting of inner diameter, inner diameter finishing and end face cutting are stored in memory in the order of machining; the machining processes are read out of the memory successively in the order of machining; and NC data are created upon determining, based on blank profile data and final part profile data, whether a machining process is one necessary for obtaining a final part.

Automatic programming systems have come into practical use and are utilized to create NC tapes from a design drawing through a simple operation by entering data in a conversational mode using a graphic display screen. With such an automatic programming system, a machining profile can be entered merely by pressing profile symbol keys which are located on an operator's panel and correspond to workpiece profiles written on a design drawing. Further, according to the automatic programming system, referential information is graphically displayed on the screen from time to time and inquiries are made in ordinary language, so that dimensions and various data can be entered in response to the inquiries. When all data necessary for creation of an NC tape have been entered, the system immediately displays graphically the blank profile and the machined profile (finished profile), begins automatic calculation of NC command data and graphically displays a tool path to create an NC tape. A programming method performed by such an automatic programming system will now be described in detail. The method comprises the following steps:
(1) blank material selection step;
(2) drawing mode selection step;
(3) blank profile and dimensions input step;
(4) machined profile and dimensions input step;
(5) machine reference point and turret position input step;
(6) machining process selection step;
(7) tool selection step;
(8) machining limits and cutting condition designation step; and
(9) tool path calculation step.
The necessary data are entered successively to eventually create the NC data (NC tape).

In the input step for entering the blank profile and the dimensions thereof, a picture for entering the blank profile and its dimensions is displayed on the graphic display screen, so that one may enter the blank profile, its dimensional values and the position of a base line while observing what is displayed. Specifically, since blank profiles for turning machining are broadly classified into cylinders, hollow cylinders and special profile blanks, the images of these blanks and their menu numbers appear on the display screen, one of the blank profiles is selected from among the displayed blank profiles by entering its menu number, and then the dimensional values, namely the length L, thickness D, bore diameter $D_o$ and base line position ZP of the blank are entered. This completes the entry of the blank profile and its dimensional values.

The steps (6) through (8) are repeated until the final finished profile is obtained. Specifically, when it is turned for the machining process selection step, a prompt for selecting the machining process is displayed on the graphic display screen. Accordingly, depending upon the machining process which is to be performed, one enters the name of the desired machining process from among those being displayed on the screen. This is followed by entering the tool to be used in the entered machining process, as well as the cutting conditions, cutting direction and cutting area for the entered machining process.

Thereafter, when a different area is to be cut with the same tool, the fact is entered. Also entered are the cutting direction and the area. On the other hand, if it is unnecessary to cut a different area with the same tool, the fact is entered. Thus, when entry of data necessary for machining in accordance with the first machining process is completed, the operator decides whether a different machining process is required in order to obtain the final part profile (finished profile); if one is, the fact is entered. Thereafter, if machining process selection, entry of data indicative of the tool to be used, and entry of cutting conditions, cutting direction and cutting area are carried out in the above fashion until the finished profile is obtained, then all the necessary data will have been entered. An automatic programming unit then creates NC data on the basis of the input data and causes a tool trajectory to be displayed on the graphic display screen, thus ending programming.

Thus, in the NC data creation method as set forth above, the entry of blank profile and finished profile is followed by determining, based on the operator's judgment, in which area machining is to be performed and by which machining process, and in which cutting direction the tool is to be moved. In addition, the sequence of the machining processes is determined and the data necessary for the machining process sequence are entered. The method of this kind is extremely versatile since the programmer is capable of freely setting the machining process sequence, the machining area and the like. However, since considerable programmer judgment is required, the programming operation is a complicated one and, hence, errors are apt to made. Moreover, a long period of time is needed for programming.

SUMMARY OF THE INVENTION

Accordingly, an object of the present invention is to provide a machining process determination method in automatic programming that enables a sequence of machining processes to be determined automatically.

Another object of the present invention is to provide a machining process determination method in automatic programming that allows a machining process sequence as well as the cutting direction and cutting area of the machining processes to be determined automatically based on the blank profile and final part profile.

The present invention provides a machining process determination method in automatic programming. The method includes storing a standard sequence of machining processes in a memory; reading the names of the machining processes out of the memory in the machining process sequence after entry of a blank profile and final part profile; discriminating based on the blank profile and final part profile whether the machining process is required; when it is not required, performing identical discrimination processing upon reading the next machining process out of the memory, when it is required, determining a cutting domain and cutting direction of the machining process based on the blank profile and final part profile; and thereafter creating NC data upon reading subsequent machining processes out of the memory and performing identical processing.

BRIEF DESCRIPTION OF THE DRAWINGS

FIGS. 2(A)–2(J) illustrate examples of displays of a conventional method;

DETAILED DESCRIPTION OF THE PREFERRED EMBODIMENT

Before describing the present invention, a conventional method of automatic programming will be discussed with reference to FIGS. 1 through 5 so that the present invention may be better understood. The present invention represents an improvement upon the processing method of steps (6), (10), (11) and (12) in the following conventional method.

Figure 1:
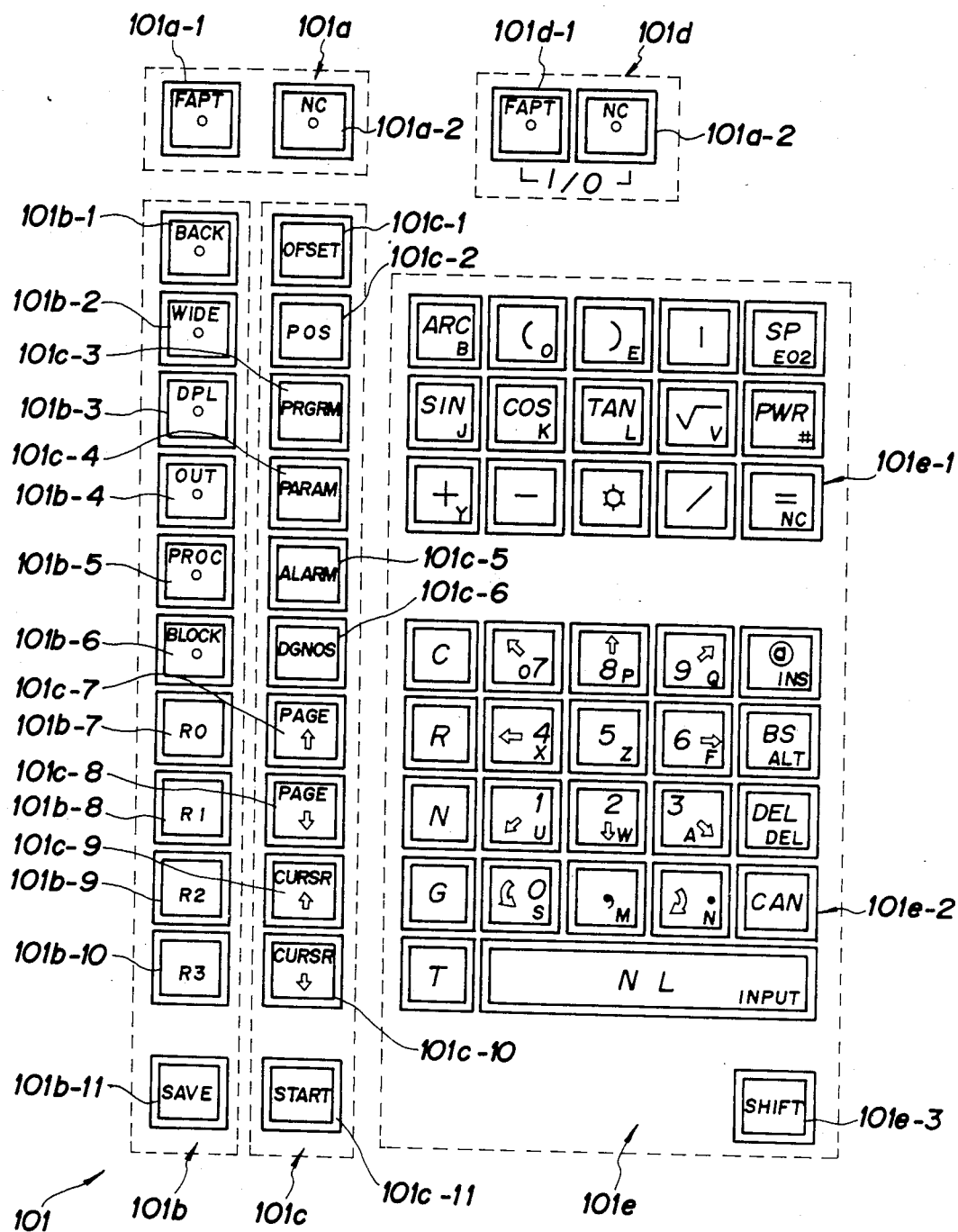
FIG. 1 illustrates the arrangement of an operator's panel.

FIG. 1 illustrates the arrangement of an operator's panel 101 used in an NC system equipped with an automatic programming function. Classified generally, the operator's panel has: (a) a one-of-two selection key group 101a for selecting whether the operator's panel 101 is to be used with an automatic programming unit (referred to as the FAPT mode) or on behalf of an NC unit (referred to as the NC mode), (b) a key group 101b used for the automatic programming unit, (c) a key group 101c used for the NC unit, (d) an I/O selection key group 101d for selectively connecting a data input/output unit to the automatic programming unit and NC unit, and (e) a common data input key group 101e used with both the automatic programming unit and the NC unit.

The one-of-two selection key group 101a has a FAPT key 101a-1 and an NC key 101a-2, both of which are provided with lamps. Pressing the FAPT key 101a-1 established the FAPT mode so that the operator's panel 101 will operate with the automatic programming unit. In the FAPT mode, the key group 101c will be ineffective even if a key in the group is pressed, and the common data input key group 101e works with the automatic programming unit. On the other hand, pressing the NC key 101a-2 establishes the NC mode, allowing the operator's panel 101 to work with the NC unit. In the NC mode, the key group 101b will be ineffective even if these keys are pressed, and the data input key group 101e will operate in conjunction with the NC unit. The key group 101b for automatic programming includes state setting keys 101b-1 through 101b-6 for setting a variety of states in automatic programming, work designating keys 101b-7 through 101b-10, and a transfer key 101b-11 for transferring NC data from the automatic programming unit to the NC unit. The state setting keys include a BACK key 101b-1 for returning a cursor when a data input is made, and a WIDE key 101b-2 for expanding the display. Among the work designating keys, the RO key 101b-7 is for designating the start of automatic programming as well as a shift to the next step. The R1 key 101b-8 is pressed when input information displayed on the screen is to be revised. In the FAPT mode, the R2 key 101b-9 is used in making inputs and outputs with respect to a material file and a tooling file; and the R3 key 101b-10 is pressed to discontinue automatic processing which is underway. The key group 101c for the NC unit includes various function keys 101c-1 through 101c-6, keys 101c-7, 101c-8 for turning the page of the display screen, keys 101c-9, 101c-10 for moving a cursor, and a start key 101c-11 for starting NC control on the basis of created NC data. An OFSET key 101c-1 is used to display and set an offset quantity; a POS key 101c-2 is used to display present position; a PRGRM key 101c-3 is employed to display the contents of a program or the block currently being executed as well as the next block; a PARAM key 101c-4 is used to display and set parameters; and an ALAM key 101c-5 is used to display the contents of an alarm. The I/O selection key group 101d, which is effective in both the FAPT and NC modes, includes a FAPT key 101d-1 for connecting a data input/output unit to the automatic programming unit, and an NC key 101d-2 for connecting the data input/output unit to the NC unit. The key group 101e for data input includes a key group 101e-1 for executing arithmetic operations and function operations; a symbolic key group 101e-2 used in entering part profiles, numerical values and alphabetic characters; and a shift key 101e-3 pressed when entering the alphabetic character indicated at the lower right of each keytop. The symbolic keys function to enter profiles or numerical values, depending upon the automatic programming step.

Figures 2A, 2B, 2C:
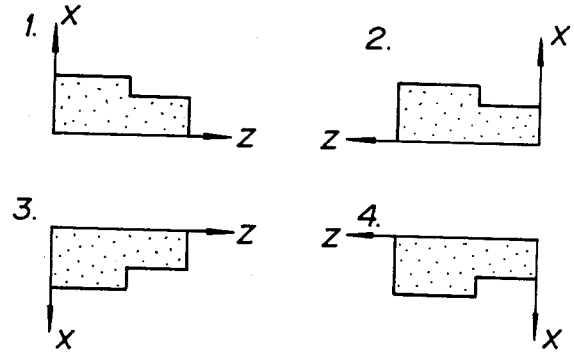

(1) If the FAPT key 101a-1 is pressed to establish the FAPT mode and this is followed by pressing the RO key 101b-7, a picture for selecting an automatic programming step is displayed on the graphic display screen, as shown in FIG. 2(A). If the numerical value key 1 is pressed and then the NL key under these conditions, the graphic display screen presents a display of the names of blank materials, the menu numbers thereof and a prompt concerning the material, as shown in FIG. 2(B). Accordingly, if the blank material is aluminum, the menu number 4 corresponding to aluminum is entered using a symbolic key and the NL key is then pressed. This ends the entry of the blank material specification or data.

(2) Next, if the RO key 101b-7 is pressed, the graphic display screen displays four drawings indicating drawing formats, the menu numbers 1, 2, 3, 4 thereof, and a prompt calling for selection of a coordinate system, as shown in FIG. 2(C). Specifically, in the case of a turning machining operation, a design drawing is written in any one quadrant of four coordinate systems, namely a first quadrant, a second quadrant, a third quadrant or a fourth quadrant, depending upon how the design drawing is written. Therefore, the graphic display screen displays diagrams representing the respective coordinate systems together with appended menu numbers, namely numerala 1, 2, 3 and 4 representing the corresponding quadrants. Thereafter, a coordinate system may be selected in response to a prompt by entering the menu number corresponding to the quadrant in which the part on the design drawing is expressed, followed by pressing the NL key.

Figure 2D:
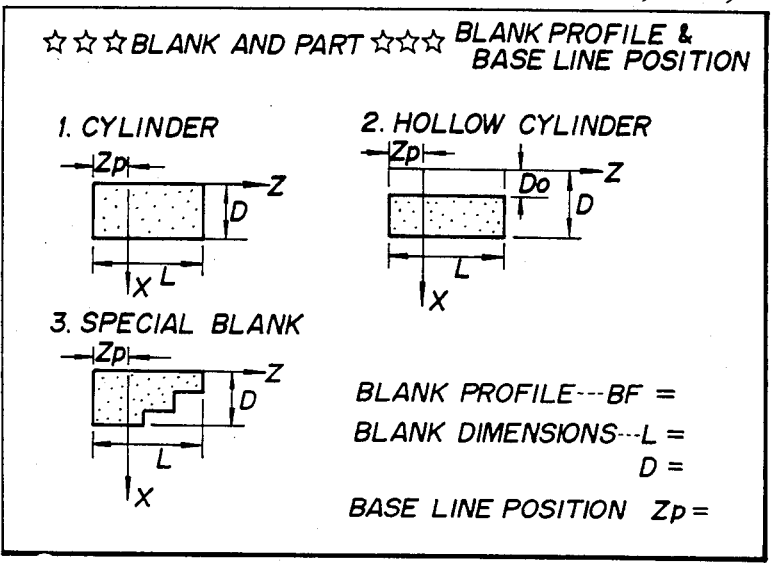
Figure 2E:
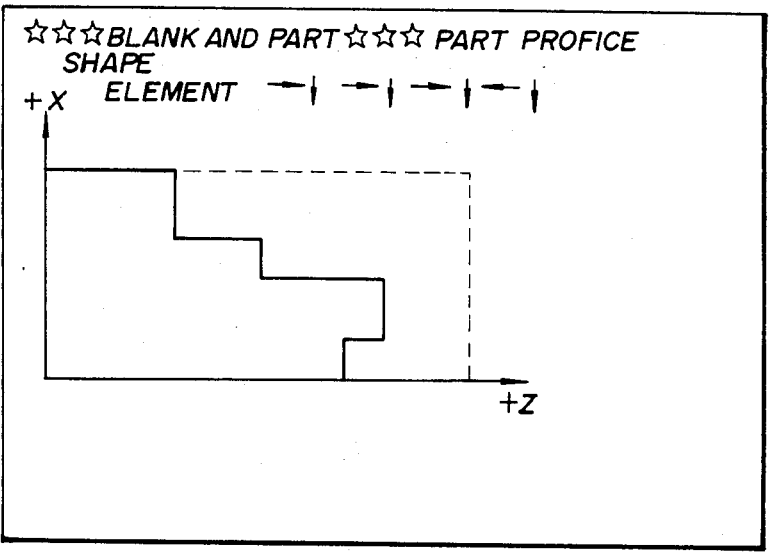

(3) If the RO key 101$b$-7 is pressed at the conclusion of coordinate system selection, a picture for entering blank profile and its dimensions appears on the graphic display screen, as shown in FIG. 2(D). While viewing what is displayed, one selects the blank profile, and enters its dimensional values L, D, $D_o$, and the position of a base line ZP. Specifically, since the profiles of blanks to be turned are broadly classified into a cylinder, a hollow cylinder and a special profile (special blank), the pictures of these blanks and their menu numbers are displayed, as shown in FIG. 2(D). One of the blank profiles is selected from among the displayed blank profiles, then, in accordance with inquiries calling for dimensional values, namely the length L, thickness D, bore diameter $D_o$ and base line position ZP of the blank, these dimensions are entered. This completes the entry of the blank profile and dimensional values.

(4) When the part profile and its dimensional values are entered and the RO key 101$b$-7 is pressed, coordinate axes and the blank profile (dotted line), as well as machined profile (part profile) inquiries, are displayed on the graphic display screen. Accordingly, in response to the inquiries and while observing the design drawing, one operates the profile symbol keys (keys indicated by ↑, →, ↓, ←, ↗, ↘, ↙, ↖, ⌐, ⌐), the C key indicating a chamfered portion, the G key indicating a groove portion, the R key representing a rounded portion, the T key representing a threaded portion, and the N key indicating a notched portion, thereby to enter the part profile. It should be noted that whenever one element of the part profile is entered by pressing a profile symbol key, a prompt calling for the dimensions of the elements is displayed, in response to which dimensions taken from the design drawing are entered. When all elements of the part profile and the dimensions thereof have been entered, the profile of the machined part in accordance with the entered part profile and dimensions is displayed on the graphic display screen, as shown by the solid line in FIG. 2(E).

Figure 2F:
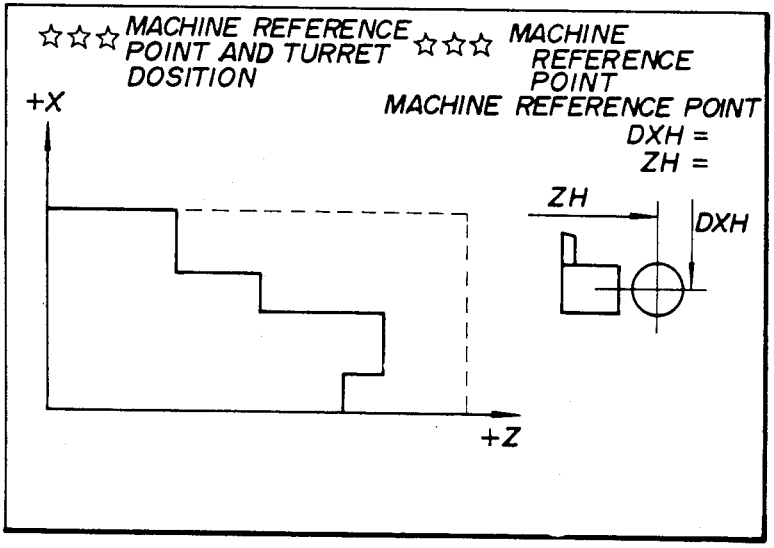

(5) Thereafter, when the RO key 101$b$-7 is pressed, the positional relationship among the machined profile, the turret and the machine reference point are displayed, as shown in FIG. 2(F), and prompts calling for the machine reference point and turret index position, which are necessary for NC data creation, are displayed. When predetermined numerical values are entered by pressing the profile symbol keys in response to the prompts, the entry of machine reference point and turret index position ends.

(6) When the entry of machine reference point and turret index position ends, prompts for machining process selection are displayed on the graphic display screen, as shown in FIG. 2(G). Specifically, when a single part is to be machined by a lathe, the machining processes available include (a) center drilling, (b) drilling, (c) rough cutting of outer diameter, (d) rough cutting of inner diameter, (e) semi-finishing of outer diameter, (f) semi-finishing of inner diameter, (g) outer diameter finishing, (h) inner diameter finishing, (i) grooving and (j) threading. Therefore, the names of these machining processes are displayed together with their menu numbers. Accordingly, depending upon machining process is to be carried out, one enters the names of the desired machining process, which appears on the screen, by way of its menu number, and presses the NL key.

(7) Next, prompts are displayed requesting identification of the tool to be used in the entered machining process, as shown in FIG. 2(H). Accordingly, one responds to the prompts by entering such data as tool number, tool position correction number, tool nose radius RN, cutting blade angle AC, nose angle AN, imaginary tool nose position XN, ZN, and data indicative of how the tool is mounted on the turret.

(8) When entry of the data indicative of the tool used ends, the graphic display screen displays prompts calling for cutting conditions for the purpose of implementing the entered cutting process, as shown in FIG. 2(I). In response to the prompts, one enters such cutting conditions as clearance quantities CX, CZ, finishing tolerances TX, TZ, depth of cut D, retraction quantity U, cutting velocity V and feedrates F1, F2, F3.

Figure 2J:
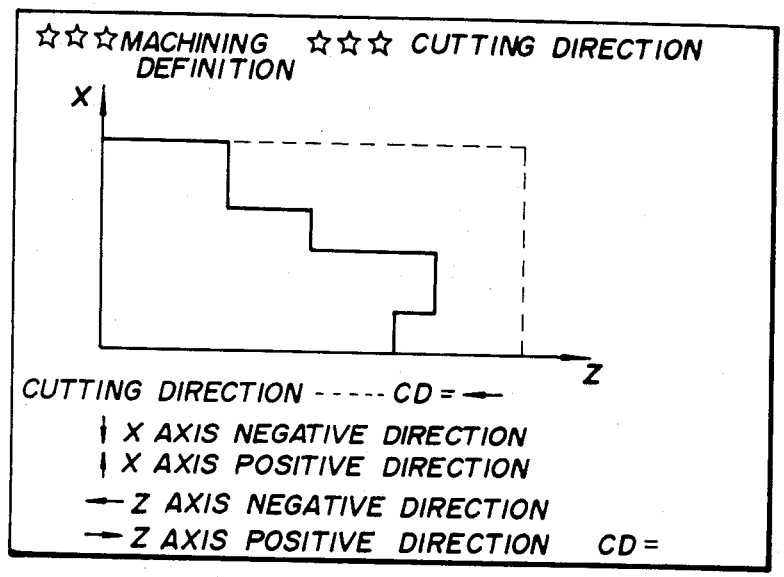
Figure 3A:
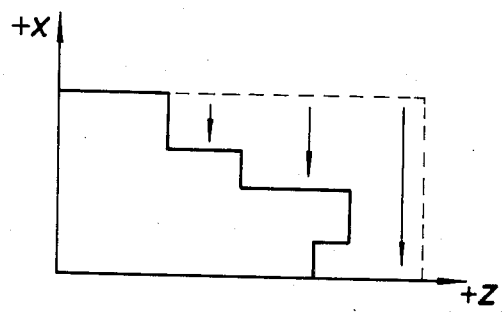
FIGS. 3(A) and 3(B) are views of cutting direction entry according to a conventional method.
Figure 3B:
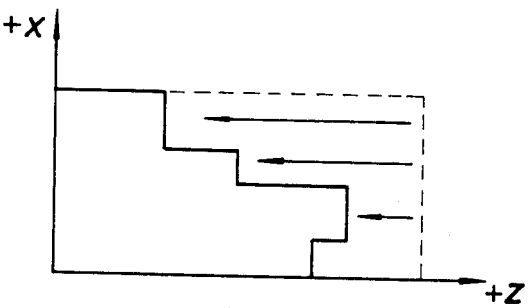

(9) When entry of the cutting conditions ends, prompts calling for cutting directions in the machining process are displayed on the graphic display screen, as shown in FIG. 2(J). The steps for entering cutting direction are steps for determining (a) whether machining is to be performed by moving the tool in the −X direction, as shown in FIG. 3(A), (b) whether machining is to be performed by moving the tool in the −Z direction, as shown in FIG. 3(B), (c) whether machining is to be performed by moving the tool in the +X direction, and (d) whether machining is to be performed by moving the tool in the +Z direction. For (a), the ↓ key among the profile symbol keys is pressed; for (b), the ← key is pressed; for (c), the ↑ key is pressed; and for (d), the → key is pressed. Thus, the desired cutting direction is entered.

Figure 4A:
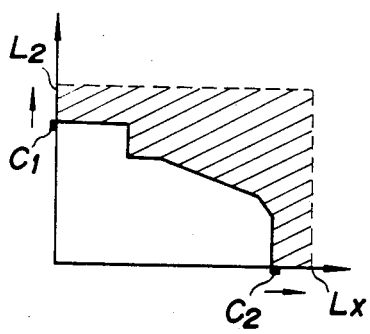
FIGS. 4(A)–4(C) are views of cutting area entry according a conventional method.
Figure 4B:
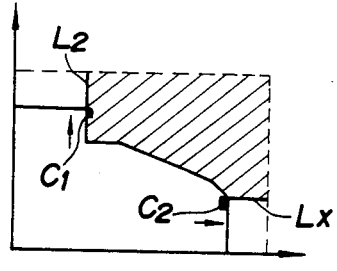
Figure 4C:
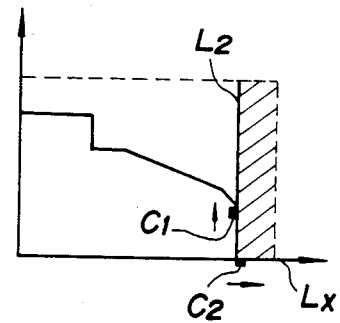

(10) When entry of cutting direction ends, a graphic for determining the area (machining area) to be machined by the entered machining process is displayed on the graphic display screen, as illustrated in FIG. 4(A). Specifically, the blank profile, cursor and prompts calling for the machining area are displayed on the screen. It should be noted that two cursors are displayed along the machined profile, one used for entering the starting point of the machining area and the other used for entering the end point of the machining area. The final part profile is displayed in the form of a solid line, and the blank profile appears as a dashed line.

Accordingly, the R1 key 101$b$-8 is pressed to position cursors C1, C2 at the starting and end points of the machining area. Note that the cursors can be moved forward or backward along the part profile depending upon whether the BACK key 101$b$-1 is off (lamp off) or on (lamp on). When entry of the machining starting and end points is concluded, the location of where machining is to be performed in the machining process is entered by using a profile symbol key. That is, when the directions of the machining area as seen from the starting and end points are entered by using profile symbol keys, a shaded portion bounded by two straight lines Lx, Lz, the blank profile and the final part profile is recognized as the machining area, as shown in FIGS. 4(A), (B), (C).

(11) When entry of the machining area ends, the graphic display screen displays the blank profile that would remain after cutting away the entered machining area. Displayed at the same time are the entered tool and an inquiry as to whether a different area is to be cut by the same tool.

Figure 5:
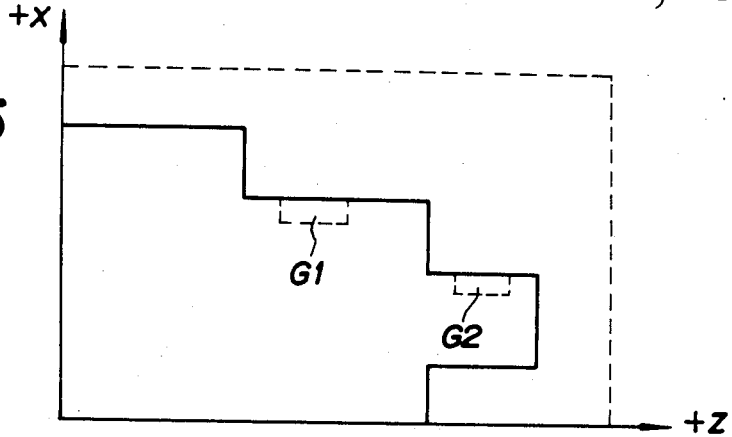
FIG. 5 illustrates a case where two or more locations are cut by the same tool.

If a different area is to be cut by the same tool, the fact is entered (the numerical value key 1 and the NL key are pressed) and so are the cutting directions and area. By way of example, in a case where the groove machining process is to be applied to two locations (portions G1, G2), as shown in FIG. 5, with each of the locations being grooves by the same tool, the numerical value 1 and the NL key are pressed after entering the machining area data for groove G1. This is followed by entering the machining area data for the groove G2.

It cutting a different area with the same tool is not required, the numeric key 0 and the NL key are pressed.

(12) When the entry of data necessary for carrying out the first machining process is completed through the foregoing steps, the operator decides whether a different machining process is required in order to obtain the final part profile. If there is such a requirement, then the RO key 101b-7 is pressed. This causes the graphic display screen to display a picture for selection of an automatic programming step, as depicted in FIG. 2(A). If this is followed by pressing the 4 key to select the "MACHINING DEFINITION" step, the machining process selection prompts shown in FIG. 2(G) are displayed on the graphic display screen. Thereafter, if machining process selection, entry of data indicative of the tool used, entry of cutting direction and entry of machining area are performed for all of the machining processes just as above, then all of the data necessary for obtaining the final part profile will have been entered. The automatic programming unit, on the basis of the entered data, then creates NC data and causes the tool trajectory to be displayed on the graphic display screen, thus ending programming. The foregoing sets forth the details of conventional automatic programming.

Figure 6:
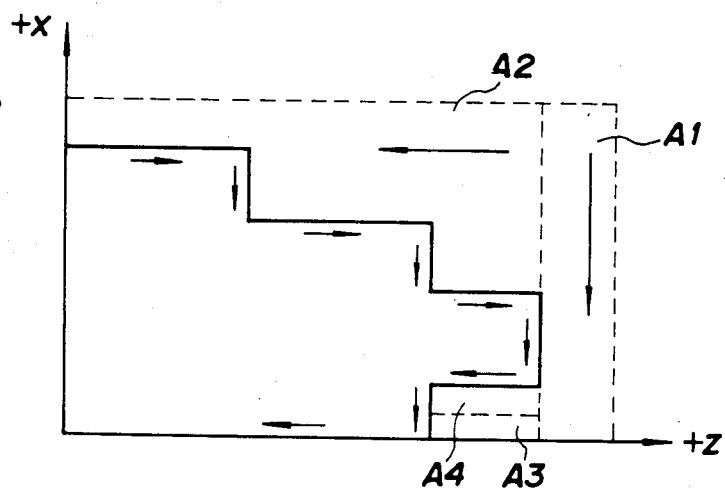
FIGS. 6 and 7 illustrate the entry of machining process data according to a conventional method.
Figure 7:
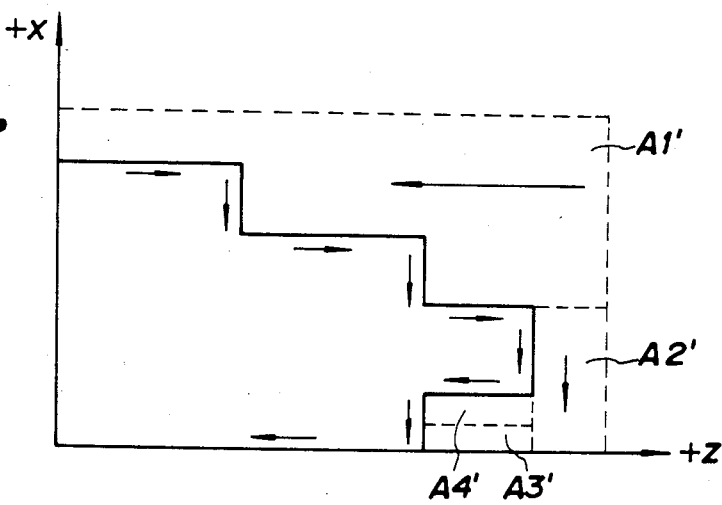

If the blank profile is of the shape indicated by the dashed line in FIG. 6 and the final part profile has the shape indicated by the solid line in FIG. 6, in the conventional method the operator enters the necessary data so as to obtain the final part by (a) subjecting the area A1 to rough end face cutting by moving the tool in the −X direction, (b) then subjecting the area A2 to outer diameter rough cutting by moving the tool in the −Z direction, (c) thereafter subjecting an area A3 to drilling, (d) subjecting an area A4 to inner diameter rough cutting by moving the tool in the −Z direction following drilling, and (e) subsequently performing end face finishing, outer diameter finishing and inner diameter finishing. However, another operator may enter the necessary data by assuming a machining method different from that set forth above. For example, as shown in FIG. 7, this operator enters the necessary data so as to obtain the final part by (a) subjecting an area A1' to outer diameter rough cutting by moving the tool in the −Z direction, (b) then subjecting an area A2' to end face rough cutting by moving the tool in the −X direction, (c) thereafter subjecting an area A3' to drilling, (d) subjecting an area A4' to inner diameter rough cutting by moving the tool in the −Z direction following drilling, and (e) subsequently performing outer diameter finishing, end face finishing and inner diameter finishing. Thus, even though the data entry methods performed by the two operators are different, the same part can be obtained, though the NC data differ. In other words, the same part can be obtained irrespective of the machining process sequence. Accordingly, an arrangement can be adopted wherein a standard sequence of machining process for a turning machining is stored in a memory. The names of the machining processes are then read out of the memory successively in the order of machining following entry of a blank profile and a part profile, the automatic programming unit then determines whether the read machining process is necessary on the basis of the blank profile and part profile, and data necessary for the machining process are created if the process is required. In addition, machining areas in the machining process can be created automatically from the blank profile and part profile. Moreover, if it is prearranged so that the cutting direction is taken as the direction for approaching the chuck, then the data required for the machining process can be created automatically based on this prearrangement.

The present invention, which is based on the foregoing points, provides a machining process determination method for automatically determining the machining processes necessary for obtaining a final part profile, and for determining the machining areas and cutting directions for the cutting processes.

Figure 8:
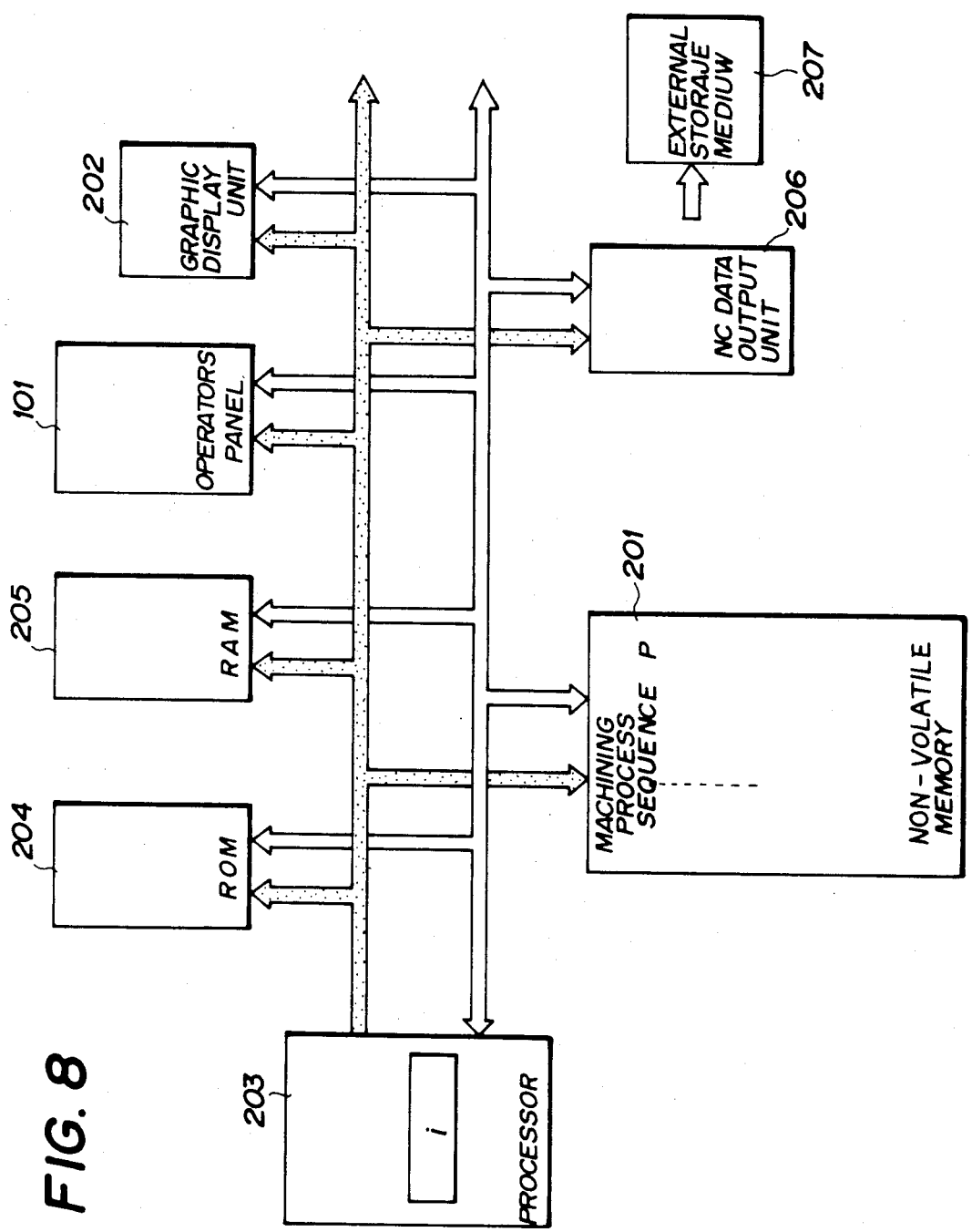
FIG. 8 is a block diagram of an embodiment of the present invention.
Figure 9A:
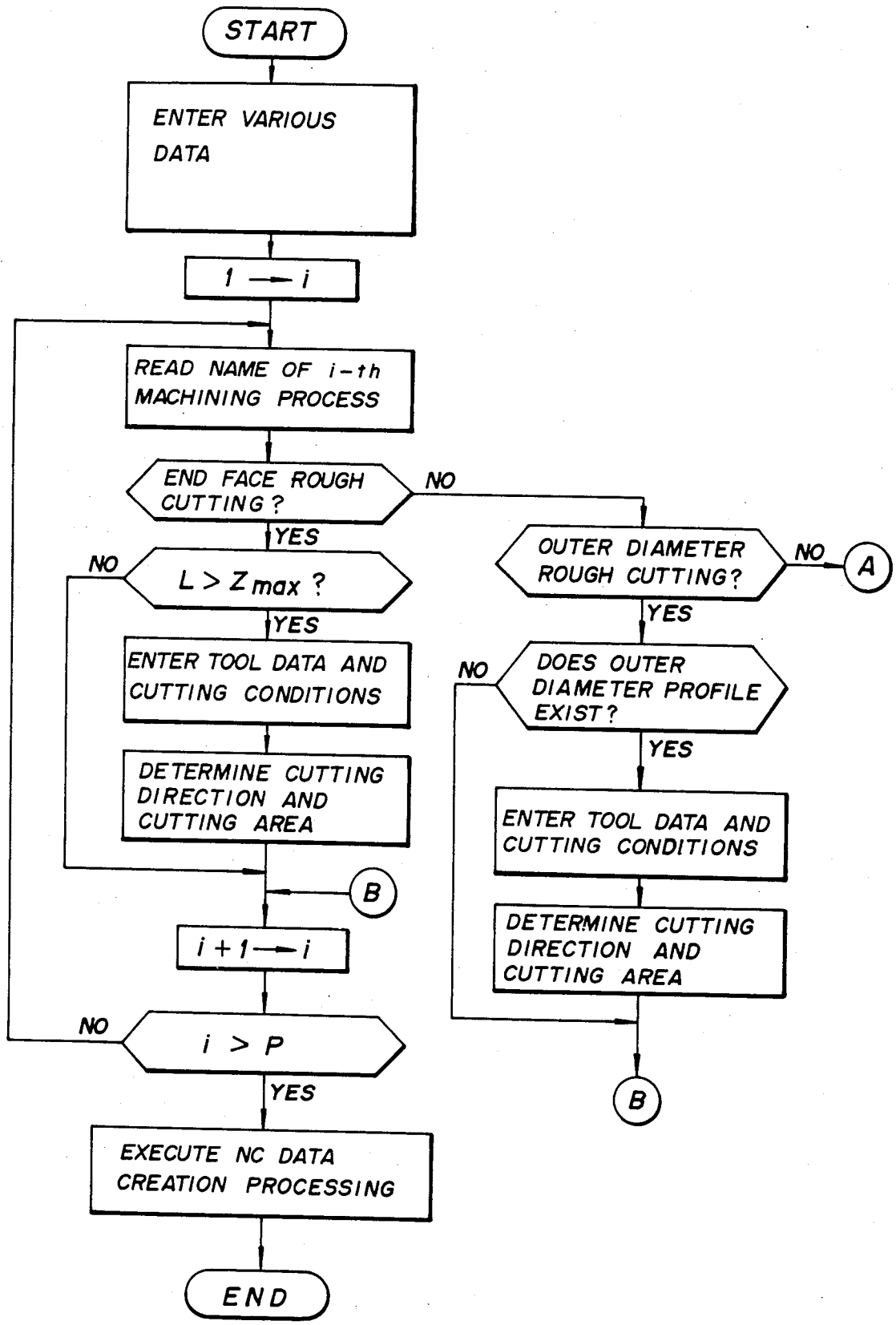
FIGS. 9(A) and 9(B) are flowcharts of processing according to the present invention.
Figure 9B:
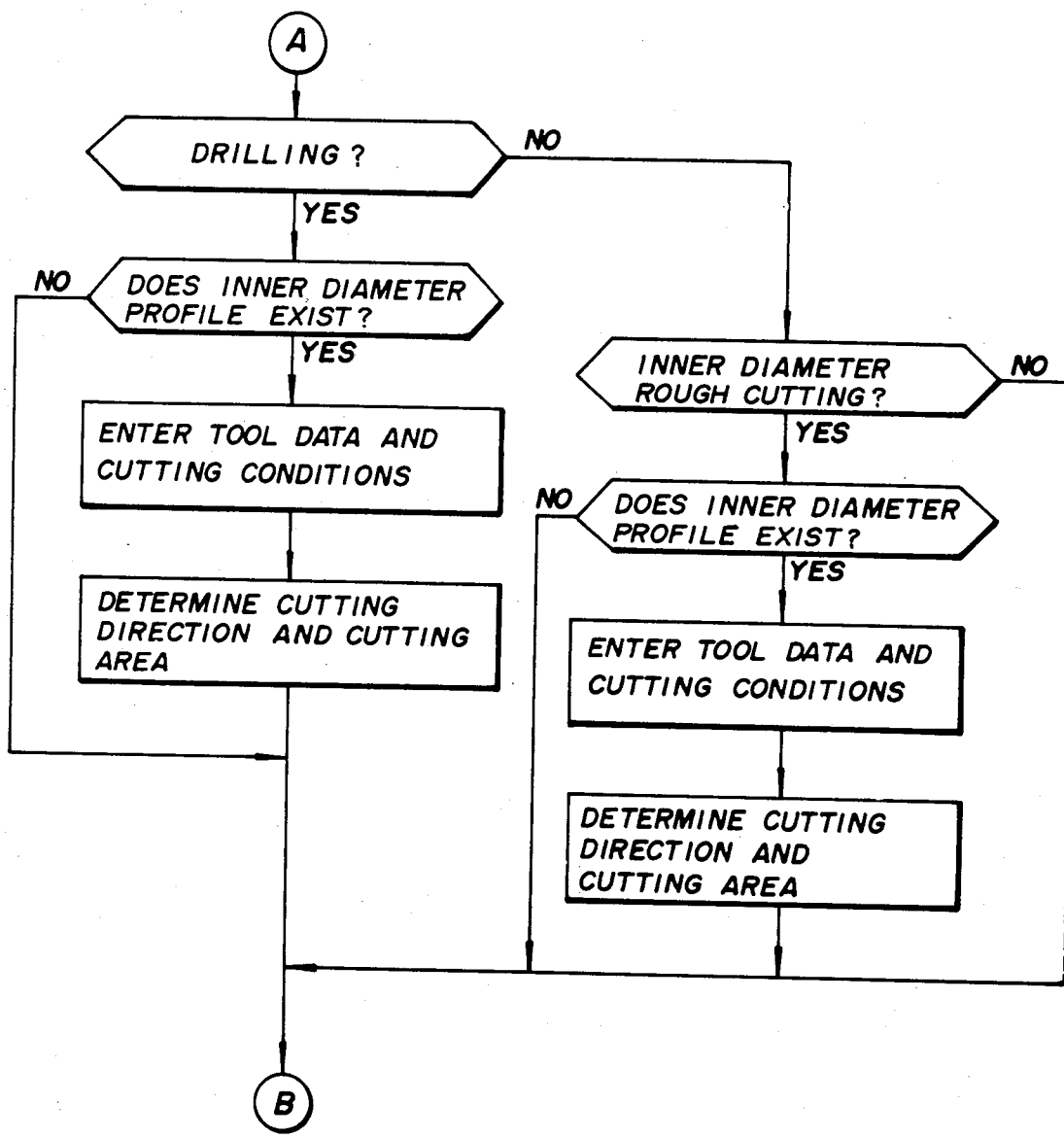

FIG. 8 is a block diagram showing an embodiment of an automatic programming apparatus according to the present invention; FIGS. 9(A) and (B) represent a flowchart of processing according to the present invention. Numeral 201 denotes a non-volatile memory for storing the names (code names) of machining processes in a machining process sequence, as well as the number of machining processes. An example of a machining process sequence is (1) end face rough cutting, (2) outer diameter rough cutting, (3) drilling, (4) inner diameter rough cutting, (5) end face finishing, (6) outer diameter finishing, (7) inner diameter finishing, (8) grooving and (9) thread cutting. The number of machining processes is nine. Numeral 202 designates a graphic display unit; numeral 203 indicates a processor; numeral 204 indicates a ROM for storing a control program numeral 205 indicates a RAM for storing data entered from the operator's panel 101 (FIG. 1), the results of processing and created NC data; and numeral 207 indicates an NC data output unit for delivering created NC data to an external memory medium 207 such as a paper tape or bubble cassette.

Figure 10A:
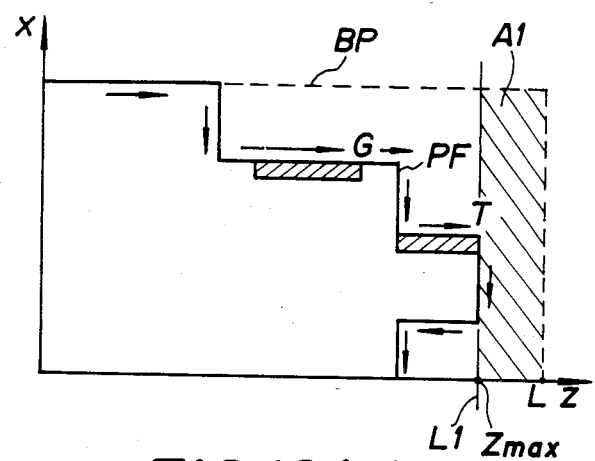
FIGS. 10(A)–10(D) illustrate the machining process determination method of the present invention.

As in the conventional method, material type format of the design drawing, profile and dimensional values of the blank material part profile and its dimensional values, machine reference point and turret index position are entered from the operator's panel 101 in response to prompts displayed on the graphic display screen. This entered data is stored in the RAM 205. A part profile PF shown by the solid line in FIG. 10(A) is entered through steps of pressing profile symbol keys and alphabetic character keys in the sequence

→ ↓ →G ↓ →T ↓ ←↓ and entering a dimensional value of a part profile element each time a profile symbol key and alphabetic character key are pressed. Note that G signifies a groove, and that T stands for a threaded portion. In the description that follows, we will assume that menu number 1 in FIG. 2(C) is selected as the drawing format, and that the blank profile is a cylinder.

Next, the processor 203 performs the operation 1→i, reads the name of the i-th machining process out of the non-volatile memory 201 and decodes the same.

If the i-th machining process is end face rough cutting, the processor 203 goes to the part profile data to obtain the maximum value $Z_{max}$ of the final part profile along the +Z axis and compares the magnitude of $Z_{max}$ with the magnitude of the already entered dimensional value L of the blank along the Z axis.

If the result of the comparison is $$L > Z_{max}$$

then it is decided that end face rough cutting is a machining process needed to obtain the final part profile, and the name of this machining process is displayed on the graphic display screen. Also displayed is a prompt calling for the tool used [see FIG. 2(H)], just as in the conventional method. In response, the programmer enters data indicative of the tool to be used while referring to the name of the machining process displayed on the graphic display screen. When the entry of the data for the tool used is completed, prompts calling for cutting conditions [see FIG. 2(I)] are displayed on the graphic display screen, jusy as in the conventional method. In response, the programmer enters the cutting conditions. It should be noted that the tool used and the cutting conditions can also be determined automatically.

Figure 10B:
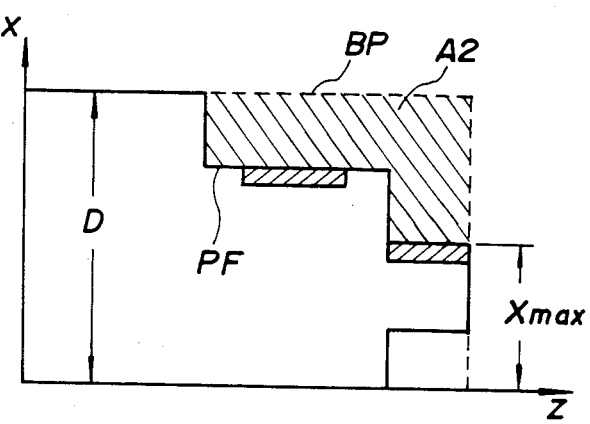

When the entry of cutting conditions ends, the processor 203 recognizes that the area A1 [see FIG. 10(A)] bounded by a straight line L1 at $Z = Z_{max}$ and by a blank profile BP is an area to be cut by end face rough cutting, and stores the chuck direction (along the −X axis) in the RAM 205 as the cutting direction. The shape remaining after removal of the cutting area A1 is the blank profile. The blank profile is displayed in the form of a dashed line and the part profile in the form of a solid line, as shown in FIG. 10(B).

Thereafter, or when end face rough cutting is unnecessary because $Z_{max} = L$, the processor 203 performs the operation $$i + 1 \rightarrow i$$

and determines whether $$i > P$$

holds.

If i>P holds, the processor 203 takes this as indicating that processing for determining the necessity of all of the preregistered machining processes and for creating the required data has been completed. The processor then proceeds to execute NC data creation processing.

If i≦P holds, on the other hand, the processor 203 reads the name of the i-th machining process out of the non-volatile memory 201 and decodes the same.

If the i-th machining process is outer diameter rough cutting, then the processor 203 checks the part profile data stored in RAM 205. If there is data indicative of the profile of an outer diameter portion, the processor decides that outer diameter rough cutting is a machining process needed to obtain the final part profile, displays the name of this machining process and displays a prompt calling for the tool to be used. When the programmer enters data indicative of the tool to be used, prompts calling for cutting conditions are then displayed. The cutting conditions are then entered. It should be noted that determining whether a profile of an outer diameter portion exists is done by obtaining the maximum value $X_{max}$ [see FIG. 10(B)] of the end face in the X direction from the part profile data and comparing the magnitude of $X_{max}$ with that of the dimensional value D of the blank in the X direction. Thus, if $D > X_{max}$ holds, a profile of an outer diameter portion exists and outer diameter cutting is required. If $D = X_{max}$, then a profile of an outer diameter does not exist and outer diameter cutting is unnecessary.

Figure 10C:
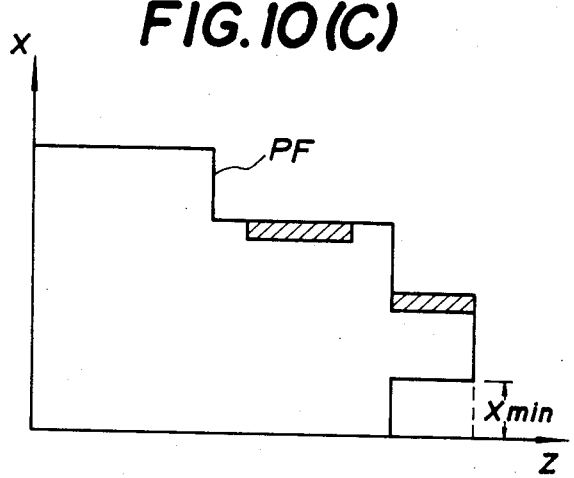

Thereafter, the processor 203 recognizes that the area A2 [see FIG. 10(B)] bounded by the blank outer diameter line and part outer diameter line is an area to be cut by outer diameter rough cutting, and stores the chuck direction (−Z direction) in the RAM 205 as the cutting direction. The shape remaining after removal of the cutting area A2 is displayed on the graphic display screen, as shown in FIG. 10(C). The dashed line portion is the blank profile.

Next, the processor 203 performs the operation $$i + 1 \rightarrow i$$

to increment i and determines whether $$i > P$$

holds. If i≦P holds, the processor reads the name of the i-th machining process out of the non-volatile memory 201 and decodes the same.

Figure 10D:
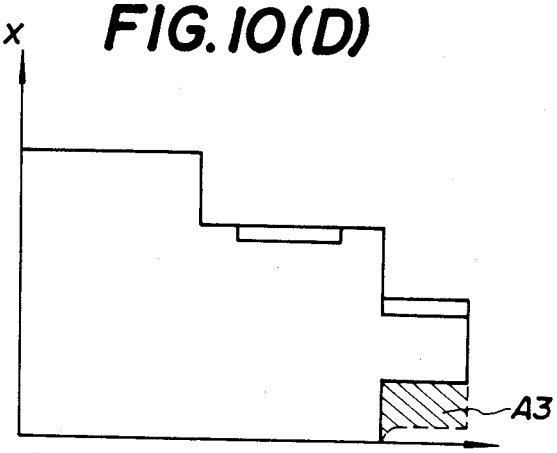
Figure 11:
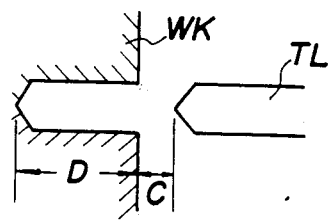
FIG. 11 illustrates cutting conditions for drilling.

If the i-th machining process is a drilling operation, it is determined whether the part profile includes a profile of an inner diameter portion. If it does, it is decided that drilling is required and both the name of the machining process and a prompt calling for the tool used are displayed. Then, when the data indicative of the tool used and the cutting conditions are entered, just as set forth above, the processor 203 displays the blank profile remaining after removal of the portion cut away by drilling, as shown in FIG. 10(D). It should be noted that the cutting conditions in the drilling process are, with reference to FIG. 11, clearance quantity C, depth of cut D, spindle rpm N, and feedrate F.

Determining whether a profile of an inner diameter portion exists is done by obtaining the mininum value $X_{min}$ [see FIG. 10(C)] of the end face in the X direction from the part profile data and checking whether $X_{min}$ is equal to zero. Thus, if $X_{min} > 0$ holds, a profile of an inner diameter portion exists and drilling is required. If $X_{min} = 0$, then a profile of an inner diameter does not exist and drilling is unnecessary.

When entry of data for drilling ends, or when drilling is unnecessary, the processor 203 performs the operation $$i + 1 \rightarrow i$$

to update i and determines whether $$i > P$$

holds. If i≦P holds, the processor reads the name of the i-th machining process out of the memory 201 and decodes the same.

If the i-th machining process is inner diameter rough cutting, the processor 203 checks the part profile data. If the final part profile includes a profile of an inner diameter portion, it is decided that inner diameter rough cutting is a machining process needed to obtain the final part profile and both the name of the machining process and a prompt calling for the tool used are displayed. When the data indicative of the tool used are entered by reference to the name of the machining process, prompts calling for cutting conditions are displayed. Accordingly, the cutting conditions are entered in response to the prompts.

Thereafter, the processor 203 recognizes that the area A3 [see FIG. 10(D)] bounded by the blank inner diameter line and inner diameter profile is an area to be cut by inner diameter rough cutting, and stores the chuck direction ($-Z$ direction) in the RAM 205 as the cutting direction. The processor 203 also causes the graphic display screen to display the profile remaining after removal of the cutting area A3.

When entry of the data for inner diameter rough cutting ends, or when inner diameter rough cutting is not required, the processor 203 performs the operation $$i+1 \rightarrow i$$

to update i and determines whether $$i > P$$

holds. If i≦P holds, the processor reads the name of the next i-th machining process out of the memory 201 and decodes the same. Thereafter, and in similar fashion, discrimination processing is performed to determine whether the i-th machining process is necessary to obtain the final part. If it is necessary, the tool data and cutting conditions used in executing the machining process are entered, and processing for automatically creating machining areas and cutting directions is executed.

Note that whether grooving is required is determined by whether a G code is contained in the part profile data, and that whether thread cutting is required is determined by whether a C code is contained in the part profile data.

When the foregoing processing is completed for all of the preregistered machining processes in the above manner, the processor 203 creates NC data based on entered or automatically created data and stores the NC data in the RAM 205.

According to the present invention, machining processes needed to obtain a final part profile, the sequence thereof, cutting directions and machining areas can be determined automatically. Accordingly, even a beginner is capable of performing programming in simple fashion without error. Moreover, the time needed for programming can be shortened.

We claim:

1. A machining process determination method in an automatic programming system having a memory and an operator's panel, said method comprising the steps of:
   (a) storing a standard sequence of machining processes in the memory;
   (b) entering blank profile data;
   (c) entering final part profile data;
   (d) automatically reading a name of a stored machining process out of the memory;
   (e) automatically discriminating, based on the blank profile data and the final part profile data, whether the read name of a stored machining process is required in order to obtain the final part profile;
   (f) if the read name of a stored machining process is not required, repeating (d);
   (g) automatically determining a machining area and cutting direction of a machining process identified by the read name, if the read name of a stored machining process is required;
   (h) automatically repeating steps (d) thru (g) for each of the stored machining processes; and
   (i) automatically creating and storing NC data for performing machining in accordance with the results of steps (d) through (h).

2. A machining process determination method for machining a part in an X, Y, Z orthogonal coordinate system according to claim 1, further comprising the steps of:
   automatically obtaining from said final part profile data a maximum value $Z_{max}$ of the part measured along a Z axis;
   automatically comparing the magnitude of $Z_{max}$ with the magnitude of a dimensional value L of said blank profile data, measured along the Z axis;
   automatically deciding that end face cutting is required when $Z_{max} < L$ holds; and
   automatically initiating data entry defining the end face cutting.

3. A machining process determination method for machining a part in an X, Y, Z orthogonal coordinate system according to claim 2, further comprising the step of:
   automatically determining a machining area based on the value of L and Z max for end face cutting.

4. A machining process determination method for machining a part in an X, Y, Z orthogonal coordinate system according to claim 1, further comprising the steps of:
   automatically obtaining from said final part profile data a maximum value $X_{max}$ of an end face of the part measured in an X direction;
   automatically comparing the magnitude of $X_{max}$ with the magnitude of a dimensional value D of said blank profile data, measured along the X axis;
   automatically deciding that outer diameter cutting is required when $D > X_{max}$ holds; and
   automatically initiating data entry defining the outer diameter cutting.

5. A machining process determination method for machining a part in an X, Y, Z orthogonal coordinate system according to claim 4, further comprising the step of:
   automatically determining a machining area in accordancd with the value D and X max for outer diameter cutting.

6. A machining process determination method for machining a part in an X, Y, Z orthogonal coordinate system according to claim 1, further comprising the steps of:
   automatically obtaining from said final part profile data a minimum value $X_{min}$ of an end face of the part measured along an X axis;
   automatically deciding that inner diameter cutting is required when $X_{min}$ 0 holds; and automatically initiating data entry defining the inner diameter cutting.

7. A machining process determination method according to claim 6, further comprising the steps of:
automatically determining a machining area in accordance with the value X min for inner diameter cutting.

8. A machining process determination method according to claim 6, wherein said data entry defining the inner diameter cutting includes entry of data defining drilling.

9. A machining process determination method for machining a part in an X, Y, Z orthogonal coordinate system with a lathe having a chuck, according to claim 1, further comprising the steps of:
storing data defining a cutting direction to be towards or away from the chuck;
storing data defining a −Z direction as a cutting direction for a step of outer diameter cutting and a step of inner diameter cutting;
storing data defining an −X direction as a cutting direction for a step of end face cutting.

* * * * *

UNITED STATES PATENT AND TRADEMARK OFFICE
CERTIFICATE OF CORRECTION

PATENT NO. : 4,723,203
DATED : February 2, 1988
INVENTOR(S) : Hajimu Kishi; Masaki Seki; Kunio Tanaka; and Teruyuki Matsumura It is certified that error appears in the above-identified patent and that said Letters Patent is hereby corrected as shown below:

Front page, [73], "Tokyo" should be -- Minamitsuru-Gun--;
[57], line 5, "," should be --;--.

Col. 3, line 30, "," should be --;--;
Line 66, "established" should be -- establishes --.

Col. 5, line 10, "numerala" should be -- numerals --;
Line 40, after " ↵ " insert --)--.

Col. 7, line 17, "grooves" should be -- grooved --;
Line 21, "It" should be -- If --.

Col. 8, line 46, after "program" insert --;--.

Col. 8, line 53, after "type" insert --,--;
Line 55, after "material" insert --,--.

Col. 12, lines 57 and 58, "accorancd" should be -- accordance --.

Col. 14, line 10, "an" should be -- a --.

Signed and Sealed this

Twenty-third Day of August, 1988

Attest:

DONALD J. QUIGG

Attesting Officer        Commissioner of Patents and Trademarks